J. T. McDERMOTT.
SAFETY GAS COCK.
APPLICATION FILED SEPT. 14, 1909.

962,378.

Patented June 21, 1910.

Witnesses

Inventor
John T. McDermott,
By Victor J. Evans.
Attorney

UNITED STATES PATENT OFFICE.

JOHN THOMAS McDERMOTT, OF BALTIMORE, MARYLAND.

SAFETY GAS-COCK.

962,378.

Specification of Letters Patent. Patented June 21, 1910.

Application filed September 14, 1909. Serial No. 517,652.

*To all whom it may concern:*

Be it known that I, JOHN T. McDERMOTT, a citizen of the United States, residing at Baltimore, in the State of Maryland, have invented new and useful Improvements in Safety Gas-Cocks, of which the following is a specification.

The purpose of this invention is to equip valves, faucets and the like for controlling the flow of fluids with safety devices to prevent the accidental opening of the same after they have been closed.

The purpose of the invention is to devise novel means for coöperating with fluid controlling cocks of the type embodying turn plugs and to combine with the latter a reciprocating cut off in the form of a pin or rod which is slidable within the said turn plug to close the opening through which the fluid passes when the valve or cock is open.

The invention consists of the novel features, details of construction and combinations of parts which hereinafter will be more particularly set forth, illustrated in the accompanying drawings and pointed out in the appended claims.

Figure 1:
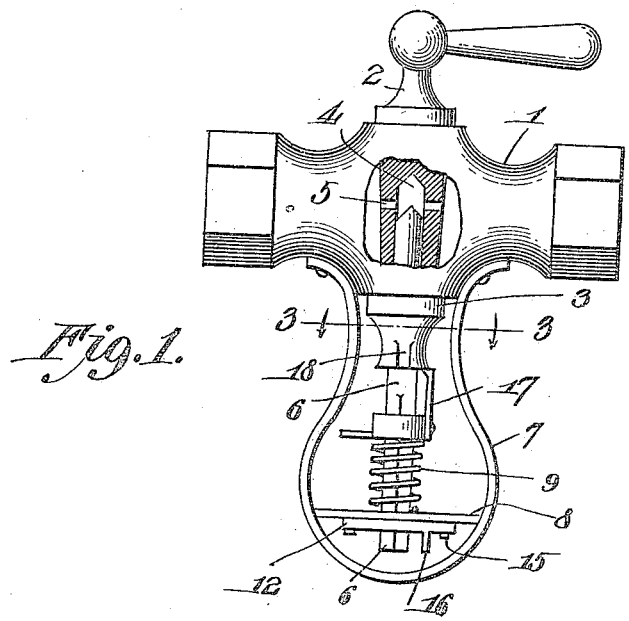
Figure 2:
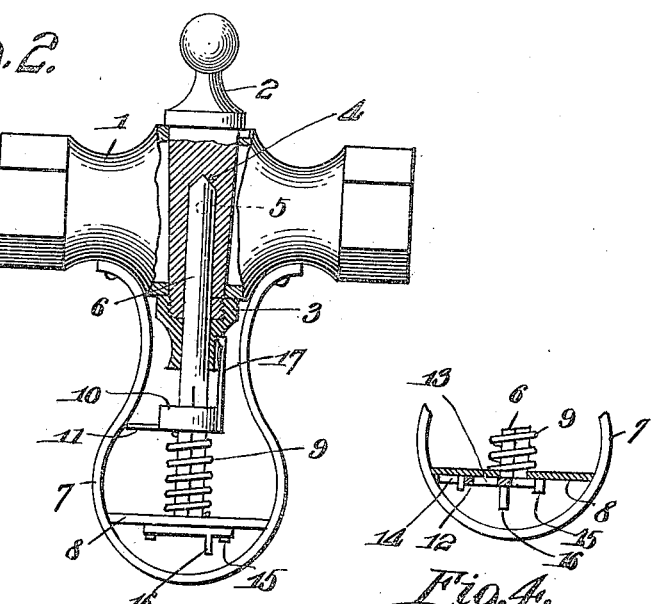
Figure 3:
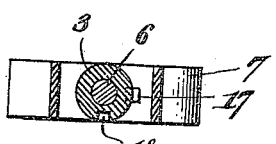
Figure 4:
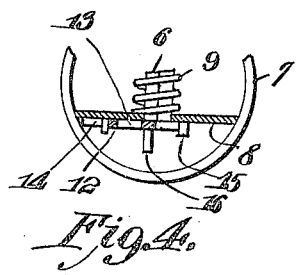
Figure 5:
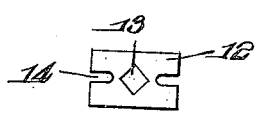

Referring to the drawings forming a part of the specification: Figure 1 is a side view of a fluid controlling cock embodying the invention, a portion of the casing being broken away and the turn plug being in section. Fig. 2 is a view of the parts shown in Fig. 2, with the turn plug closed and the cut-off moved inward. Fig. 3 is a horizontal section on the line 3—3 of Fig. 1. Fig. 4 is a sectional view of the slide and guide at the lower end of the frame which supports the safety devices. Fig. 5 is a detail view of the slide.

Corresponding and like parts are referred to in the following description and indicated in all the views of the drawings by the same reference characters.

The casing 1 of the cock, valve or like device may be of any approved construction and is provided with a turn plug 2 for controlling the flow of fluid therethrough. The turn plug is tapered and is mounted in a tapered opening of the valve casing and its smaller end projects and receives a nut 3 by means of which the turn plug is held in place and wear compensated for. An opening 4 extends longitudinally of the turn plug and intersects the openings 5 in the sides thereof through which the fluid passes when the valve or cock is open. A cut-off 6 is mounted to slide within the opening 4 and across the openings 5 thereby preventing any flow of fluid through the valve even though the turn-plug should be turned into a position to normally admit of the passage of fluid through the valve. The opening 4 in the turn-plug is round in horizontal section and the portion of the cut-off arranged to operate therein is of corresponding form thereby admitting of rotation of the turn plug without imparting any rotary movement to the cut-off. The cut-off is mounted to receive a reciprocating movement but is held against rotary movement.

A frame 7 is secured to the valve casing 1 and is approximately of U-form and is provided near its outer or lower end with a cross bar 8 which constitutes a guide for the outer end of the cut-off. The outer or projecting end of the cut-off 6 is of angular formation or otherwise formed to operate in a corresponding opening formed in the cross bar 8 so as to hold the cut-off from turning when moving the turn plug 2. A helical spring 9 of the expansive type is mounted upon the cut off 6 and normally exerts a force to press said cut-off into the opening 4 and across the openings 5 intersected thereby. The spring 9 is confined between the cross bar 8 and a stop 10 forming a part of or secured to the cut off 6 and preferably consisting of a collar pinned or otherwise made fast to said cut-off. A finger piece 11 projects laterally from the stop 10 and is pressed upon when it is required to withdraw the cut off or move the same outward so as to uncover the openings 5. A slide 12 is mounted upon the underside of the cross bar or guide 8 and has an opening 13 of a shape corresponding with the opening formed in said cross bar 8 to admit of the passage of the outer end of the cut-off when the same is moved outward. The slide 12 is formed with open slots 14 in which operate headed pins 15 secured to the cross bar 8 and which pins connect the slide to the cross bar and direct the same in its reciprocating movements. For convenience of moving the slide 12 it is provided with a finger piece 16. When the slide 12 is moved so as to throw the opening 13 out of register with the opening in the cross bar or guide 8, the cut off 6 is prevented from outward movement thereby preventing accidental opening of the valve by any one unfamiliar with its operation.

When the valve is set to admit of fluid passing therethrough the cut-off 6 is moved outward. It will be understood that when the cut-off 6 is moved outward the spring 9 is compressed, hence, it is necessary to provide means for holding the cut-off in its outward position. This is accomplished by means of an arm 17 secured to the stop 10 and adapted to engage the outer end of the nut 3 upon which it is adapted to ride during a portion of the revolution of the turn plug. When the turn plug reaches the closed position in its rotation, a groove 18 formed in a side thereof registers with the arm 17 and the latter entering said groove is pressed forward by the action of the spring 9 thereby causing the cut-off to enter the opening 4 with the result that communication through the valve or cock is interrupted even though the turn plug should accidentally be moved to a position which ordinarily would admit of the flow of fluid therethrough.

From the foregoing taken in connection with the accompanying drawings it will be understood that the invention provides a safety valve or cock designed for fluids generally but of special advantage for cutting off illuminating gas or like fluid which if allowed to escape would cause asphyxiation.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed is—

1. In a fluid controlling cock embodying a plug valve and casing, said plug having a longitudinal opening and other openings for the passage of the fluid intersected by said longitudinal opening, a cut-off slidably mounted in the longitudinal opening of the plug valve, means normally exerting a pressure to move said cut-off inward, and means adapted to hold said cut-off in outward position when the valve is open and adapted to move inward with said cut-off, the instant the valve is closed, thereby automatically closing the fluid passage of said valve.

2. In a fluid controlling cock embodying a casing and a turn plug, the latter having a longitudinal opening and a transverse fluid passage intersected by the longitudinal opening, a cut-off mounted to slide in the longitudinal opening of the turn plug, a spring normally exerting a pressure upon the cut-off to move the same inward, a longitudinal arm for holding the cut-off in withdrawn position, and a member having a portion cutaway to provide a clearance for said arm when in register therewith to admit of the cut-off moving within the longitudinal opening of the turn plug.

3. In a cock of the type described comprising a casing and a turn plug, the latter having a longitudinal opening, and an intersecting fluid passage, a cut-off mounted to slide in the longitudinal opening of the turn plug, and held against rotation, a spring normally tending to press the cut-off within the longitudinal opening of the turn plug, and an arm carried by said cut-off and adapted to engage a part of the casing to hold the cut-off in withdrawn position, said arm coöperating with a part having a groove into which the arm is adapted to move to admit of the cut-off closing when the turn plug reaches a given position in its movement.

4. In combination, a valve casing, a turn plug mounted in said casing and having a longitudinal opening, and a fluid passage intersecting the longitudinal opening, a nut fitted to the projecting end of the turn plug to hold the same in place, and having a groove in a side, a cut-off mounted to slide within the longitudinal opening of the turn plug and held against rotary movement, a spring normally exerting a pressure upon the cut-off to move the same within the longitudinal opening of the turn plug, and an arm carried by said cut-off to ride upon the said nut and hold the cut-off in withdrawn position and adapted to enter the groove of said nut to admit of the cut-off automatically closing.

5. In combination, a valve casing, a turn plug mounted therein and having a fluid passage, and a longitudinal opening intersecting said passage, a cut-off slidably mounted in the longitudinal opening of the turn plug, a spring normally exerting a pressure upon the cut-off to move the same within the longitudinal opening of the turn plug, a frame embodying a bar having an opening through which the outer end of the cut-off is adapted to move, and a slide mounted upon said bar and having an opening to aline with the cut-off to admit of outward movement thereof, said slide serving to prevent outward movement of the cut-off when moved to a position to throw the opening thereof out of line with said cut-off.

6. In combination, a casing, a turn plug mounted in the casing and having a longitudinal opening intersecting the fluid passage thereof, a nut fitted to the projecting end of the turn plug and having a groove in a side thereof, a frame extended from said casing, and having a cross bar at or near its outer end formed with an opening, a cut-off mounted to slide in the opening of the turn plug, and held against rotation, a stop on the outer end of the cut-off, an arm projected from said stop and adapted to ride upon the said nut and to enter the groove thereof, and a slide mounted upon the cross bar and having an opening to register with the opening in the cross bar, the parts being arranged to operate, substantially as and for the purpose specified.

In testimony whereof I affix my signature in presence of two witnesses.

JOHN THOMAS McDERMOTT.

Witnesses:
  JAMES EDWARD FARLEY,
  JAMES BRUIN HAND.